(No Model.)
L. FARIS.
HUB ATTACHING DEVICE.
No. 453,968. Patented June 9, 1891.
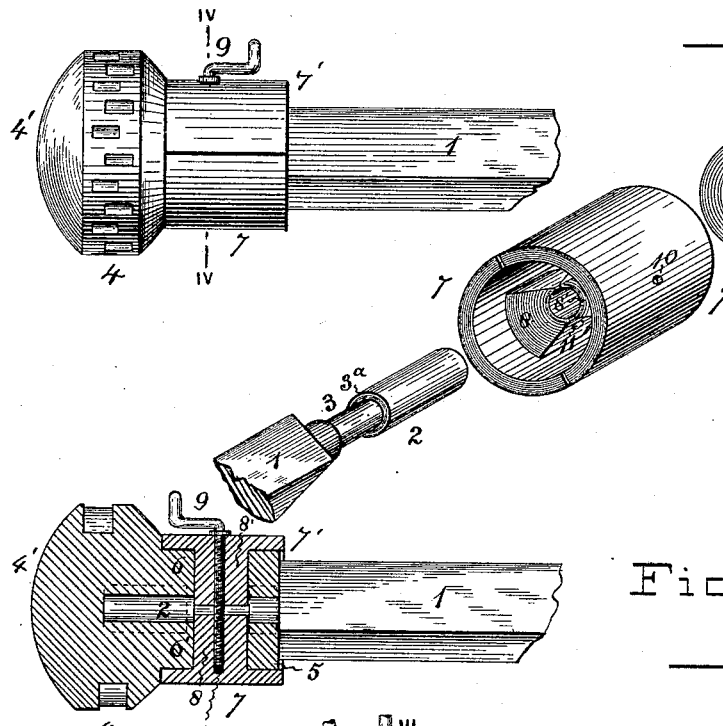
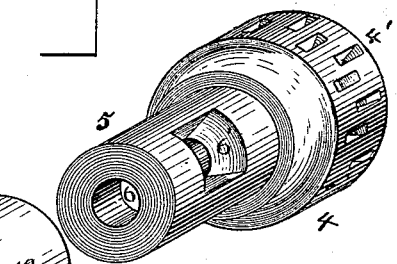
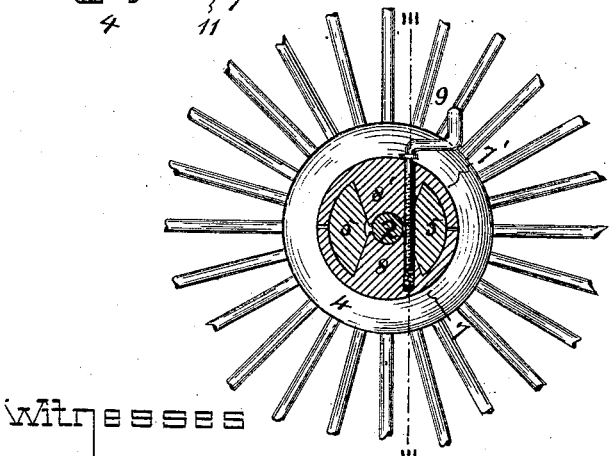
Witnesses
John F. Nelson
Lillie Hanna
Inventor
Lafayette Faris
By Smight & Bro
Att'ys.

UNITED STATES PATENT OFFICE.

LAFAYETTE FARIS, OF PRICETOWN, OHIO, ASSIGNOR OF ONE-HALF TO THOMAS W. DE HASS, OF SAME PLACE.

HUB-ATTACHING DEVICE.

SPECIFICATION forming part of Letters Patent No. 453,968, dated June 9, 1891.

Application filed October 13, 1890. Serial No. 367,975. (No model.)

*To all whom it may concern:*

Be it known that I, LAFAYETTE FARIS, a citizen of the United States, residing at Pricetown, Highland county, State of Ohio, have invented a new and Improved Device for Securing Wheels to Axles of Vehicles, of which the following is a specification.

My invention is more especially designed for and is here shown as applied to the wheels of road-vehicles; and it relates to a construction of wheel-hub and correlatively thereto of axle-spindle which permits the hub to be closed entirely in front, so as to receive any desired finish, wholly exclude dust and other impurities, and to prevent both escape of lubricant and its drying and "gumming" upon the spindle.

In the accompanying drawings, Figure I is a side elevation of a wheel-hub and axle-spindle, illustrating my invention. Fig. II shows the parts detached. Fig. III is a section on line III III, showing the parts in position. Fig. IV is a section on line IV IV.

1 may represent a portion of an axle-body, and 2 one of the two spindles thereof.

3 is a groove turned or swaged circumferentially in the spindle so as to provide a circumferential shoulder $3^a$.

4 represents a wheel-hub closed, as shown at 4', in front, and whose rear boss 5 is pierced by two diametric slots 6 6', whose location is such as to come opposite the groove 3 when the hub is in position on the spindle.

7 7' are two semi-annular shells, having interior lugs 8 8', which, when the shells are in position on the hub, extend through the slots 6 6 into the groove 3, and thereby (while permitting free rotation of the hub around the spindle) hold the hub securely in place upon the spindle. The shells themselves are fastened in position by means of a screw 9, which, passing through a hole 10 in one shell and the lug thereof, is screwed into a threaded hole 11, tapped in the opposing lug.

In large wheels one or more additional fastening-screws may be employed, if desired.

Having thus described my improved device for securing wheels to axles, I claim as new and desire to secure by Letters Patent—

The combination of the spindle 2, having a circumferential groove 3, a hub 4, having diametric slots 6 6' opposite said groove, a pair of semi-annular shells 7 7', having interior lugs 8 8' to occupy said slots and penetrate said groove, and one or more fastening-screws 9, substantially as set forth.

LAFAYETTE FARIS.

Witnesses:
J. R. HORST,
J. H. KEECH.